United States Patent
Herzog et al.

(10) Patent No.: US 9,610,974 B2
(45) Date of Patent: Apr. 4, 2017

(54) DIFFERENTIAL CONTROL USER INTERFACE FOR REVERSING VEHICLE AND TRAILER SYSTEM

(71) Applicant: Continental Automotive Systems, Inc., Auburn Hills, MI (US)

(72) Inventors: Brandon Herzog, Auburn Hills, MI (US); David Leslie Agnew, Clarkston, MI (US); Andre Payant, Rochester Hills, MI (US)

(73) Assignee: Contintental Automotive Systems, Inc., Auburn Hills, MI (US)

( * ) Notice: Subject to any disclaimer, the term of this patent is extended or adjusted under 35 U.S.C. 154(b) by 79 days.

(21) Appl. No.: 14/836,141

(22) Filed: Aug. 26, 2015

(65) Prior Publication Data

US 2016/0059889 A1    Mar. 3, 2016

Related U.S. Application Data

(60) Provisional application No. 62/043,569, filed on Aug. 29, 2014.

(51) Int. Cl.
| | |
|---|---|
| *B62D 13/06* | (2006.01) |
| *B60W 30/18* | (2012.01) |
| *B62D 15/02* | (2006.01) |

(52) U.S. Cl.
CPC ....... *B62D 13/06* (2013.01); *B60W 30/18036* (2013.01); *B62D 15/027* (2013.01); *B60W 2720/22* (2013.01)

(58) Field of Classification Search
None
See application file for complete search history.

(56) References Cited

U.S. PATENT DOCUMENTS

| | | | | |
|---|---|---|---|---|
| 9,234,331 | B1* | 1/2016 | Sharma | E02F 9/225 |
| 9,522,699 | B2* | 12/2016 | Raad | B62D 13/06 |
| 2014/0172232 | A1* | 6/2014 | Rupp | B60W 30/18036 |
| | | | | 701/36 |
| 2014/0379217 | A1* | 12/2014 | Rupp | B62D 13/06 |
| | | | | 701/41 |
| 2016/0039456 | A1* | 2/2016 | Lavoie | B62D 15/027 |
| | | | | 701/41 |
| 2016/0059889 | A1* | 3/2016 | Herzog | B62D 13/06 |
| | | | | 701/41 |

* cited by examiner

*Primary Examiner* — Redhwan K Mawari
*Assistant Examiner* — Edward Torchinsky

(57) ABSTRACT

A disclosed method of maneuvering a vehicle-trailer unit in reverse travel with a backing system includes, among other things, determining that the vehicle-trailer unit is backing up with an electronic control unit for the backing system. A current hitch angle is determined, which represents the relative angle between the vehicle and the trailer with the electronic control unit. A requested hitch angle rate of change versus distance traveled is calculated with the electronic control unit, wherein the requested hitch angle rate of change is based upon a input from a joystick control which provides a requested hitch angle rate of change signal value in proportion to the joystick position. A steering angle is calculated with the electronic control unit based upon the requested hitch angle rate of change, wherein the steering angle will allow movement of the vehicle-trailer unit in the reverse direction to obtain the requested hitch angle rate of change; and a request is sent to a steering system to provide the steering angle.

16 Claims, 4 Drawing Sheets

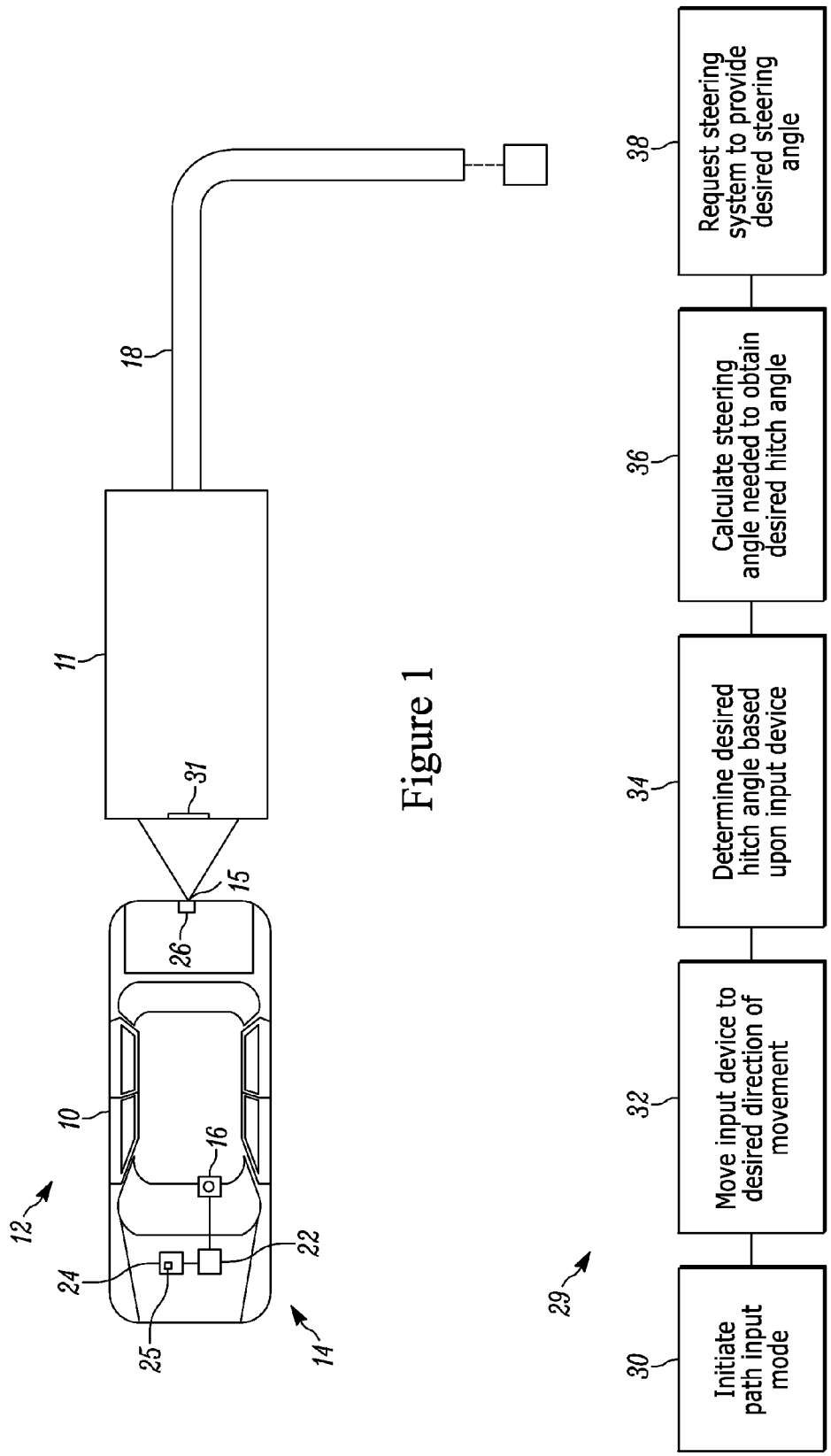

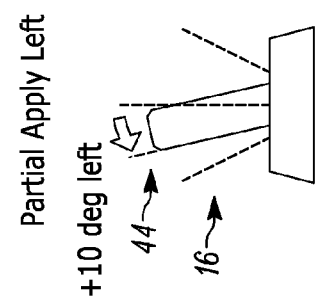
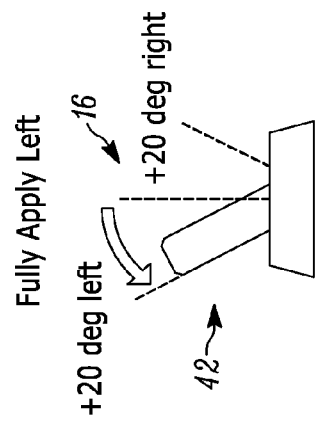
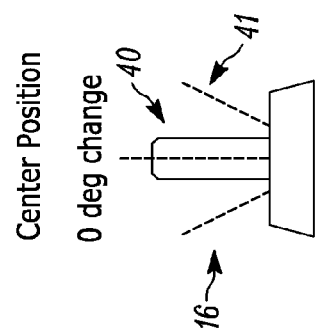
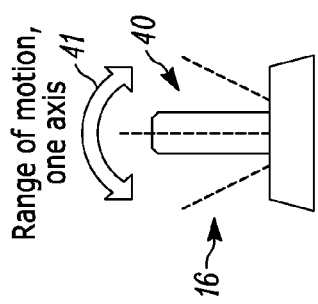

DIFFERENTIAL CONTROL USER INTERFACE FOR REVERSING VEHICLE AND TRAILER SYSTEM

CROSS REFERENCE TO RELATED APPLICATION

This application claims priority to U.S. Provisional Application No. 62/043,569 filed on Aug. 29, 2014.

TECHNICAL FIELD

The present invention is related to a method, system and electronic processing device for maneuvering a towing vehicle and a connected trailer when the vehicle-trailer unit is in the process of backing up.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed method of maneuvering a vehicle-trailer unit in reverse travel with a backing system includes, among other things, determining that the vehicle-trailer unit is backing up and the rate (velocity) at which the unit is backing up with an electronic control unit for the backing system. A current hitch angle is continuously determined, which represents the relative angle between the vehicle and the trailer allowing a calculation of the momentary rate of change of the hitch angle with regard to the distance being traveled with the electronic control unit. A requested hitch angle rate of change is calculated with the electronic control unit, wherein the requested hitch angle rate of change is based upon a input from a joystick control which provides a requested hitch angle rate of change signal value in proportion to the joystick position. A steering angle is calculated with the electronic control unit based upon the requested hitch angle rate of change, wherein the steering angle will allow movement of the vehicle-trailer unit in the reverse direction to obtain the requested hitch angle rate of change; and a request is sent to a steering system to provide the steering angle.

A backing system for a vehicle-trailer unit, wherein the trailer has a front with a trailer tongue and the vehicle has a rear with a trailer hitch, the trailer tongue being connected to the trailer hitch allowing a horizontal swivel movement of the trailer around the hitch the system comprises, among other things, a sensor for sensing a current hitch angle, which represents the relative angle between the vehicle and the trailer. A joystick control is available for providing a differential input used to determine a requested hitch angle rate of change. An electronic control unit for the backing system is also provided and includes instructions for: determining that the vehicle-trailer unit is backing up; determining the current hitch angle, based upon information from the sensor; calculating the requested hitch angle rate of change based upon the differential input from the joystick control; calculating a steering angle based upon the requested hitch angle rate of change, wherein the steering angle will allow movement of the vehicle-trailer unit in the reverse direction to obtain the requested hitch angle rate of change; and sending a request to a steering system to provide the steering angle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic diagram of a first embodiment of a vehicle-trailer unit having a trailer backing system of the present invention;

FIG. 2 is a schematic illustration of a method of utilizing the trailer backing system of FIG. 1;

FIG. 3a-d are a schematic illustrations of a joystick controller for the trailer backing system of FIGS. 1-2, wherein the joystick is shown at different positions of an available range of motion;

DETAILED DESCRIPTION

Figure 4:
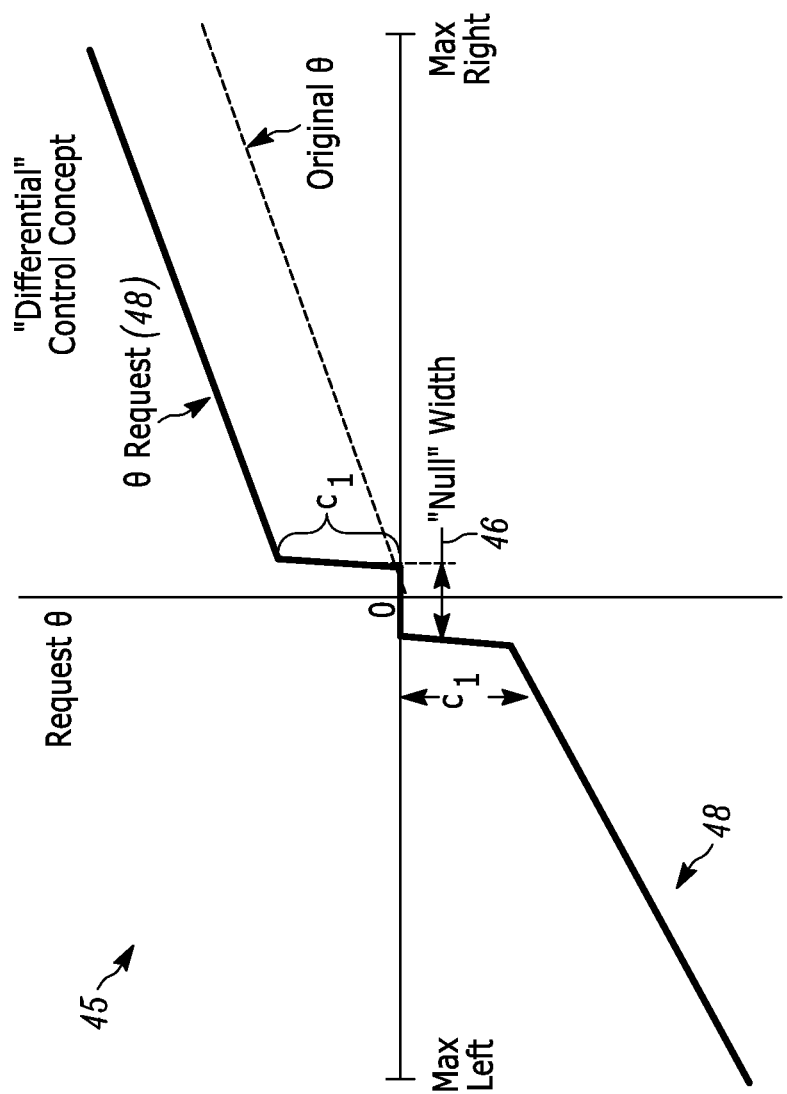
FIG. 4 is a schematic diagram of joystick controller positions when the current trailer angle is zero degrees, for the trailer backing system of the present invention of FIGS. 1-3.

The following description is merely exemplary in nature and is in no way intended to limit the disclosure, its application, or uses. For purposes of clarity, the same reference numbers will be used in the drawings to identify similar elements.

FIG. 1 illustrates a vehicle 10 and a trailer 11. The trailer 11 is controllably secured to the vehicle 10 to form a vehicle-trailer unit 12. The vehicle-trailer unit 12 utilizes a trailer backing system 14 of the present invention. Throughout the application the relative directions of forward and rear are in reference to the direction which an operator for the vehicle 10 would typically be facing when operating the vehicle 10 in a drive gear on a public road. Therefore, in operation of the trailer backing system 14 the vehicle 10 would be in a reverse gear and the operator may be facing backward. The trailer backing system 14 provides the vehicle operator with a method of electronically defining an intended backing direction 18 of the vehicle-trailer unit 12. The trailer backing system 14 utilizes the intended backing path 18 to control movement of vehicle-trailer unit 12.

Referring to FIGS. 1-5, a first embodiment for utilizing the trailer backing system 14 is described. The trailer 11 is connected to the vehicle 10 through trailer hitch 15, which allows the trailer to swivel horizontally around the vertical axis of the trailer hitch 15, which is the axis vertical to the drawing plane. An input device 16 is electronically connected to the vehicle 10 and the trailer backing system 14. The trailer backing system 14 includes an electronic control unit (ECU) 22. The ECU 22 may be connected to at least one vehicle system 24 such as a steering system. Other vehicle systems, such as powertrain and/or a brake systems to control and direct movement of the vehicle-trailer unit 12 may also be connected to the control unit 22.

The ECU 22 communicates with a control module 25 for the steering system 24. The control module 25 is an electronic processing unit controlling an active power steering system 24 that is capable of actively changing a steering angle of front axle wheels 27 without the vehicle driver giving a respective input through the vehicle steering wheel. The active power steering system 24 may also include the capability of additionally steering the rear axle wheels 27. The control module 25 computes corrective actions to be taken in order to maneuver the vehicle and initiates the power steering system 24 accordingly. Thus, the control unit 22 sends instructions to the steering system 24 to move the vehicle-trailer unit 12 based upon the input from the control unit 22.

A sensor 26, a display screen 28 and the input device 16 are all connected to the ECU 22. The input device 16, sensor 26 and display screen 28 may already be existing and incorporated into the vehicle 10. For example, the input device 16 may be a joystick controller that is used with a navigation/information system, and display screen 28 may already be integrated within the vehicle 10, e.g. part of a navigation system or entertainment unit, or may be a separate device, such as a hand-held navigation system, that is electrically connected to the vehicle 10.

The sensor 26 may be used to measure hitch angle of the vehicle. The sensor 26 may be one or multiple sensors measuring relative distance between the vehicle 10 and the trailer 11 and using the varied distance to calculate hitch angle. The sensors 26 may use horizontal or vertical features on the trailer 11 in the distance measurement.

In one embodiment the sensors 26 is a camera, preferably a camera which is already installed in the vehicle 10, such as a back-up camera. The camera 26 may capture an image and image analysis may be used to calculate the hitch angle. A distinct marking 31 can be established on the trailer 11 and captured by the camera 26 for analysis. For example, the marking 31 may be a 3 or more of dots spaced apart from one another and positioned on the front of the trailer 11 proximate to the hitch 15. The camera 26 may capture an image of the marking 31 and the ECU 22 may analyze the image to determine the relative position of the dots to one another. The ECU 22 compares the relative distances of the dots and to stored data of the relative distances. The stored data would include at what hitch angle those relative distances would occur. Thus, the hitch angle can be calculated using a camera for the sensor 26 and a predetermined distinct marking. The marking 31 may be specific to the trailer backing system 14, e.g. a know decal to be applied to the trailer 11, since the relative distances of the markings 31 may be prerecorded by the ECU 22. The distance to the marking 31 from the camera 16 may also need to be input into the system 14.

In another embodiment the trailer backing system 14 can use reference points on the trailer 11 as markings 31, such as the corners of the trailer, hitch attachment point, body decals that are provided by the manufacturer, etc. The ECU 22 may employ a learning mode to learn the relative distances at known hitch angles the first time the system 14 is used. The trailer backing system 14 could learn the relative distances between the markings 31 when the trailer 11 is hitched to the vehicle 10 and at a known angle, e.g. zero degrees hitch angle.

The display 28 may illustrate a schematic or image of an area located behind the vehicle-trailer unit 12. For example, the display 28 shows a video stream of the movement of trailer 11 as recorded by a rear-facing camera 16 mounted on the vehicle 10. The display 28 may further include virtual guides. In the shown embodiment, a first virtual guide indicates the direction of straight alignment between vehicle 10 and trailer 11. Other guides may contain distance markers to give the driver an intuitive measure of determining the angle between vehicle 10 and trailer 11 by being able to compare the distance of the trailer's right side from the vehicle 10 with the distance of the trailer's left side from the vehicle 10. The virtual guides may have differently colored sections to show the driver safe, intermediate and risky relative distances between each side of the trailer 11 and the vehicle 10. The display 28 may be controlled by the ECU 22

FIG. 2 illustrates an embodiment of a method of using the trailer backing system 14, shown at 29. The path input mode for the trailer backing system 14 is initiated, step 30. A vehicle operator would use the input device 16 to input an intended direction of moving the trailer 11, step 32. The ECU 22 interprets the joystick 16 movement to a steering angle required, step 34.

The trailer backing system 14 is designed to work real-time in which the vehicle-trailer unit 12 moves as the user inputs the directions through the input device 16, step 36. If the actual angle between the vehicle and the trailer differs from an intended angle by an amount greater than a stored threshold value, the power steering system 24 applies a corrective steering angle. The threshold value corresponds to a difference caused by a relatively small angle of at most 10°. The smaller the stored threshold value is, the more sensitive the control will be. The exact threshold value may be empirically determined to best satisfy a driver's need. It could also be set by the driver of the respective vehicle 10.

FIGS. 3a-d illustrate an input device 16, where the device is a joystick. The joystick 16 may utilize differential control signals. The differential control signals use movement of the joystick 16 the right and left and interprets the movement to begin a steering request in the direction chosen. Once the trailer 11 is at the user's desired position (hitch angle) the joystick 16 is released, returning to the center position 40, and the backing system 14 continues controlling the present hitch angle while the vehicle is in motion and will not change this hitch angle until additional input is provided via the joystick. Additionally, for a given speed, the amount of joystick input will be proportional to how fast the system changes the hitch angle in the desired direction. As mentioned above, anti-jack knife measures will limit the maximum hitch angle to either side. If the joy stick is held constantly to one side of the zero position 42 or 44, the hitch angle will eventually reach this maximum limit and the system will control the hitch angle to this value until the driver requests a reduction. In this manner a differential control of the joystick 16 may require less user interaction, since control of the joystick 16 is only required until the desired direction of motion is obtained. Once obtained, release of the joystick 16 will maintain the current direction of motion Referring to FIGS. 3a-d, the joystick 16 is shown in several positions of an available range of motion. FIG. 3a illustrates the joystick 16 in a center position 40 and the range of motion 41. As indicated by FIG. 3b when the joystick 16 is in the center 40 of the range of motion 41 the backing system 14 keeps the current hitch angle as the vehicle-trailer unit 12 is backing up. FIGS. 3c and 3d illustrate how a user would request a change in the hitch angle from the backing system 14. If the joystick is moved to a partial extent 44 of the range of motion available, FIG. 3d, the backing system 12 changes the hitch angle by a first value, in the example shown 10 degrees. If the joystick is moved to a full extent 42 of the range of motion available, FIG. 3c, the backing system 12 changes the hitch angle by a second value, in the example shown 20 degrees. The direction of change for the hitch angle is determined by the direction of movement of the joystick 16, left in FIGS. 3c-d. For a request to change the hitch angle in the right direction the joystick 16 may be fully or partially moved in the right direction.

A method of controlling the vehicle-trailer unit 12 with the backing system 14 would include the ECU 22 determining a position of the joystick relative to the range of motion of the joystick 16, and requesting a change in the current hitch angle of a first value when the joystick is moved a partial distance of the range of motion from a center of motion, and requesting a change in the current hitch angle of a second value when the joystick is moved a full distance of the range of motion from the center of motion. The direction of the requested change is based on the position of the joystick relative to the center of the range of motion. When the joystick 16 is in the center of the range of motion the ECU 16 sends a steering request that results in the current hitch angle being continued.

On the other hand, the first value and the second value may be proportional degrees of change based upon the position of the joystick 16 to the range of motion, e.g. every 10% change in one direction of the range of motion results in a 5 degree change in the requested hitch angle. The proportional change may be incrementally or continuously variable.

Alternatively, the joystick 16 may be a proportional input joystick. A proportion control where the joystick outputs a requested trailer angle based on joystick position and straight up indicates straight backing motion. For example, the joystick 16 may be moved to the end of travel in the right direction and held there. The ECU 22 will interpret this as a request to steer to the maximum allowed angle and hold that angle while the joystick 16 remains in place.

While the drawing shows the ECU 22 separate from the control module 25 and from the power steering system 24, these modules can obviously be integrated into processing units cooperating to perform the described functions. The ECU 22 can, therefore, be an after-market add-on Not shown is an optional additional camera mounted at the rear of the trailer and facing backward. Such a camera could further aid the driver of the vehicle if the direct view in the driving direction is obstructed while traveling in the reverse.

FIG. 4 illustrates how the requested trailer angle rate of change may be determined by the ECU 22, 45. A "Null" width, shown at 46, which is an area around the knob/joystick 16 center position that results in no change request in trailer angle. That is, the knob/joystick 16 must move a preset minimal amount before a requested change is recognized by the ECU 22. Once the joystick/knob 16 moves more than the preset minimal amount it is outside this null width area, shown at 48, the fixed value, $+/-c_1$, is then requested as the desired trailer angle. The change of the trailer angle is represented by a delta in trailer angle request, e.g. 5 degrees more than the current trailer angle).

Figure 5:
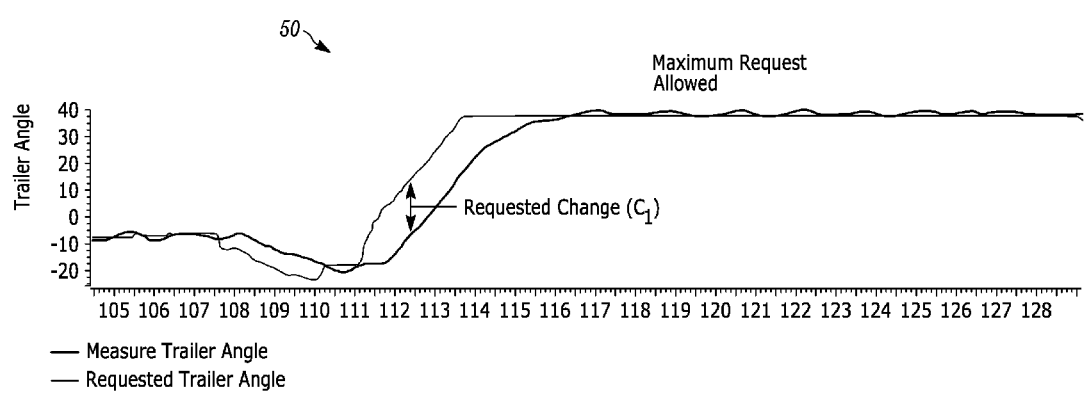
FIG. 5 is a schematic diagram of joystick controller when the current trailer angle is varied, for the trailer backing system of the present invention of FIGS. 1-3.

FIG. 5 illustrates an example graph 50 of the measured trailer angle versus the requested trailer angle, where movement of the knob/joystick 16 actually results in a change of the current trailer angle. A request of $C_1$ degrees more than the current trailer angle is shown, up to a maximum trailer angle available to the backing system 14. The maximum trailer angle available may be limited to prevent jackknifing of the trailer and/or by the specific configuration of the hitch, vehicle and trailer assembly 10.

A method of maneuvering a vehicle-trailer unit in reverse travel with a backing system, wherein the trailer has a front with a trailer tongue and the vehicle has a rear with a trailer hitch, the trailer tongue being connected to the trailer hitch allowing a horizontal swivel movement of the trailer around the hitch the method comprises determining that the vehicle-trailer unit is backing up with an electronic control unit for the backing system and determining a current hitch angle, which represents the relative angle between the vehicle and the trailer with the electronic control unit. A requested hitch angle rate of change (angle change/distance traveled) is calculated with the electronic control unit, wherein the requested hitch angle rate of change is based upon a input from a joystick control which provides a requested hitch angle rate of change signal value in proportion to its position. A steering angle is calculated with the electronic control unit based upon the requested hitch angle rate of change, wherein the steering angle will allow movement of the vehicle-trailer unit in the reverse direction to obtain the requested hitch angle rate of change. A request is sent to a steering system to provide the steering angle.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of maneuvering a vehicle-trailer unit in reverse travel with a backing system, wherein the trailer has a front with a trailer tongue and the vehicle has a rear with a trailer hitch, the trailer tongue being connected to the trailer hitch allowing a horizontal swivel movement of the trailer around the hitch the method comprising:
   determining that the vehicle-trailer unit is backing up with an electronic control unit for the backing system;
   determining a current hitch angle, which represents the relative angle between the vehicle and the trailer with the electronic control unit;
   calculating a requested hitch angle rate of change versus distance traveled with the electronic control unit, wherein the requested hitch angle rate of change is based upon a input from a joystick control which provides a requested hitch angle rate of change signal value in proportion to the joystick position calculating a steering angle with the electronic control unit based upon the requested hitch angle rate of change, wherein the steering angle will allow movement of the vehicle-trailer unit in the reverse direction to obtain the requested hitch angle rate of change; and sending a request to a steering system to provide the steering angle.

2. The method of claim 1, further comprising continuing calculating the steering angle to provide the requested hitch angle rate of change while the vehicle-trailer unit is moving in the reverse direction, and continuing to send the request to the steering system.

3. The method of claim 2, wherein once the requested hitch angle rate of change is obtained the backing system continues to request the steering angle required to move the vehicle-trailer unit at the requested hitch angle rate of change.

4. The method of claim 1, wherein calculating a requested hitch angle further comprises;

determining a position of the joystick relative to the range of motion of the joystick;

requesting a change in the current hitch angle rate of change of change of a first value when the joystick is moved a partial distance of the range of motion from a center of motion, wherein the direction of the requested change is based on the position of the joystick relative to the center of the range of motion;

requesting a change in the current hitch angle rate of changehitch angle rate of change of change of a second value when the joystick is moved a full distance of the range of motion from the center of motion, wherein the direction of the requested change is based on the position of the joystick relative to the center of the range of motion; and requesting that the current hitch angle rate of change be continued when the joystick is in the center of the range of motion.

5. The method of claim 4, wherein the first value and the second value are preset incremental degrees of change to the current hitch angle rate of change.

6. The method of claim 4, wherein the first value and the second value are proportional degrees of change based upon the position of the joystick to the range of motion.

7. The method of claim 1, wherein the vehicle-trailer unit has a first and a second distance sensor laterally spaced from each other and generating output information representative of the distance between the front of the trailer and the rear of the vehicle, and wherein the electronic control unit calculates the current hitch angle rate of change based upon a difference between the distances measured by the first distance sensor and the second distance sensor.

8. The method of claim 1, wherein the vehicle has a driver-operable back-up assistance switch activating an automatic back-up, the method including the step of detecting that the switch has been set to activate the method.

9. A backing system for a vehicle-trailer unit, wherein the trailer has a front with a trailer tongue and the vehicle has a rear with a trailer hitch, the trailer tongue being connected to the trailer hitch allowing a horizontal swivel movement of the trailer around the hitch the system comprising:

a sensor for sensing a current hitch angle, which represents the relative angle between the vehicle and the trailer;

a joystick control for providing a differential input used to determine a requested hitch angle rate of change; and an electronic control unit for the backing system, wherein the electronic control device includes instructions for:

determining that the vehicle-trailer unit is backing up;

determining the current hitch angle, based upon information from the sensor;

calculating the requested hitch angle rate of change based upon the differential input from the joystick control;

calculating a steering angle based upon the requested hitch angle rate of change, wherein the steering angle will allow movement of the vehicle-trailer unit in the reverse direction to obtain the requested hitch angle rate of change; and sending a request to a steering system to provide the steering angle.

10. The backing system of claim 9, wherein the electronic control device contains further instructions to continuing calculating the steering angle to provide the requested hitch angle rate of change while the vehicle-trailer unit is moving in the reverse direction, and continuing to send the request to the steering system.

11. The backing system of claim 10, wherein once the request steering angle is obtained the electronic control device contains further instructions to continue to request the steering angle required to move the vehicle-trailer unit at the requested hitch angle rate of change.

12. The backing system of claim 9, wherein the electronic control device contains further instructions for:

determining a position of the joystick relative to the range of motion of the joystick;

requesting a change in the current hitch angle rate of change of a first value when the joystick is moved a partial distance of the range of motion from a center of motion, wherein the direction of the requested change is based on the position of the joystick relative to the center of the range of motion;

requesting a change in the current hitch angle rate of change of a second value when the joystick is moved a full distance of the range of motion from the center of motion, wherein the direction of the requested change is based on the position of the joystick relative to the center of the range of motion; and requesting that the current hitch angle rate of change be continued when the joystick is in the center of the range of motion.

13. The backing system of claim 12, wherein the first value and the second value are preset incremental degrees of change to the current hitch angle rate of change.

14. The method of claim 12, wherein the first value and the second value are proportional degrees of change based upon the position of the joystick to the range of motion.

15. The backing system of claim 12, wherein the vehicle-trailer unit has a first and a second distance sensor laterally spaced from each other and generating output information representative of the distance between the front of the trailer and the rear of the vehicle, and wherein the electronic control unit has instructions for calculating the current hitch angle rate of change based upon a difference between the distances measured by the first distance sensor and the second distance sensor.

16. The backing system of claim 12, wherein the vehicle has a driver-operable back-up assistance switch activating an automatic back-up, and wherein the electronic control unit has instructions for detecting that the switch has been set to activate the backing system.

* * * * *